United States Patent [19]
McEwin

[11] 3,907,404
[45] Sept. 23, 1975

[54] SAFETY REFLECTOR FOR BICYCLE

[76] Inventor: Bennie L. McEwin, 352 E. Papago Dr., Tempe, Ariz. 85281

[22] Filed: June 21, 1974

[21] Appl. No.: 482,507

Related U.S. Application Data

[63] Continuation-in-part of Ser. No. 349,441, April 9, 1973, abandoned, which is a continuation-in-part of Ser. No. 247,739, April 26, 1972, abandoned.

[52] U.S. Cl. .................................. 350/99; 350/97
[51] Int. Cl.² .......................................... G02B 5/12
[58] Field of Search ....... 350/97, 99, 103, 107, 108; 40/103, 67, 68.6

[56] References Cited
UNITED STATES PATENTS

| | | |
|---|---|---|
| 2,546,781 | 3/1951 | Rheeling .......................... 350/97 |
| 3,551,024 | 12/1970 | Priest, Jr. ......................... 350/99 |

OTHER PUBLICATIONS

A.P.C. Application of D. Swarovski, Ser. No. 322,151, Published May 4, 1943.

*Primary Examiner*—John K. Corbin
*Attorney, Agent, or Firm*—Don J. Flickinger

[57] ABSTRACT

Apparatus for attachment at one or more locations on a bicycle to alert a motorist of the presence of the bicycle. The apparatus includes a shield, preferably of triangular configuration, having at least one light emitting surface. The shield is movably suspended from mounting means securable to the bicycle.

1 Claim, 18 Drawing Figures

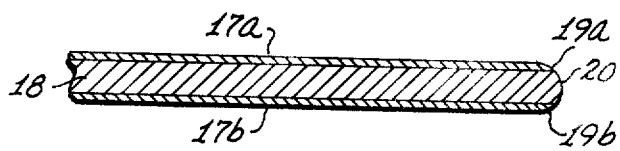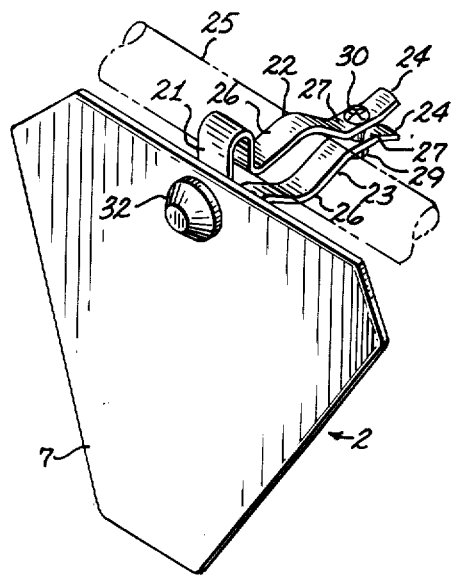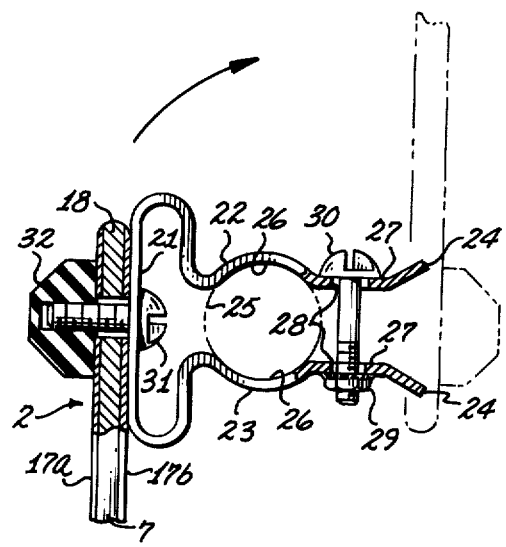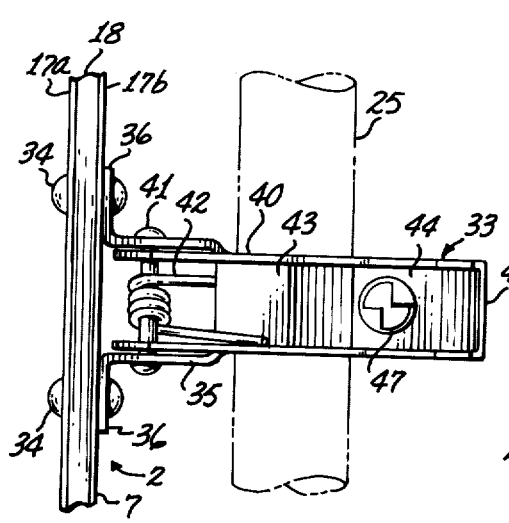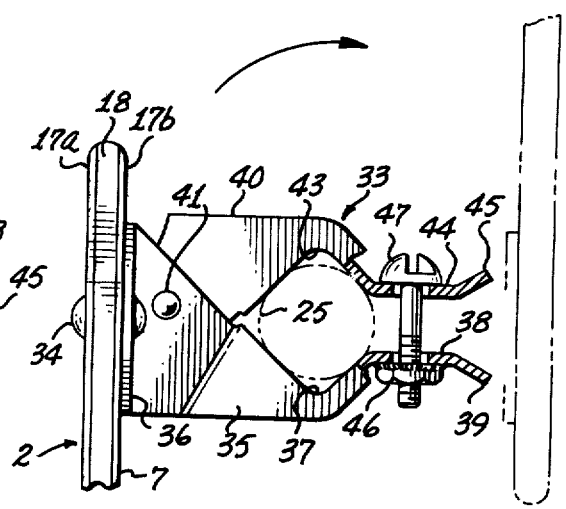

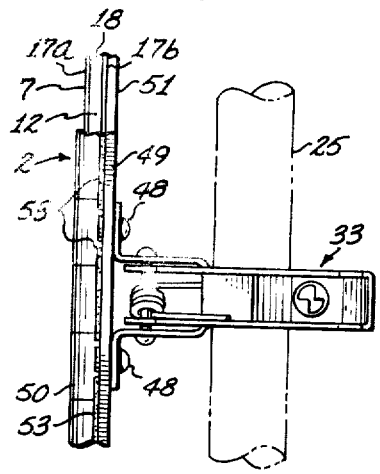
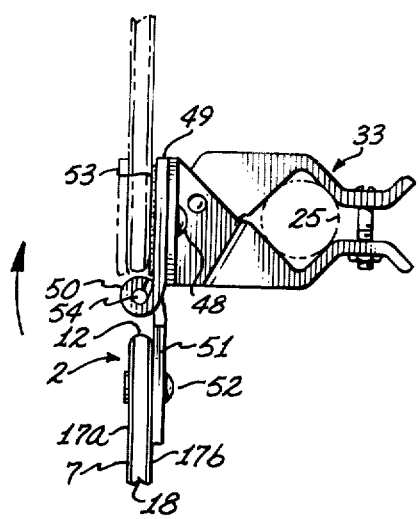
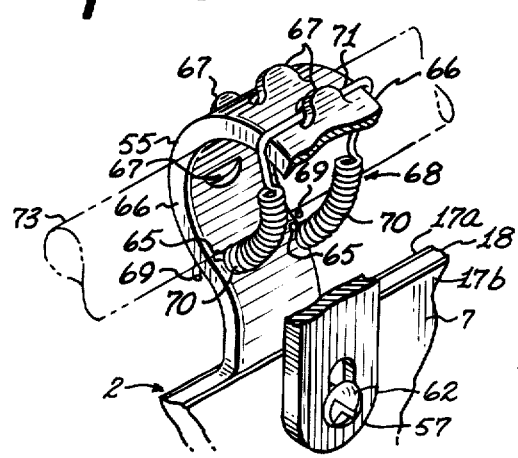

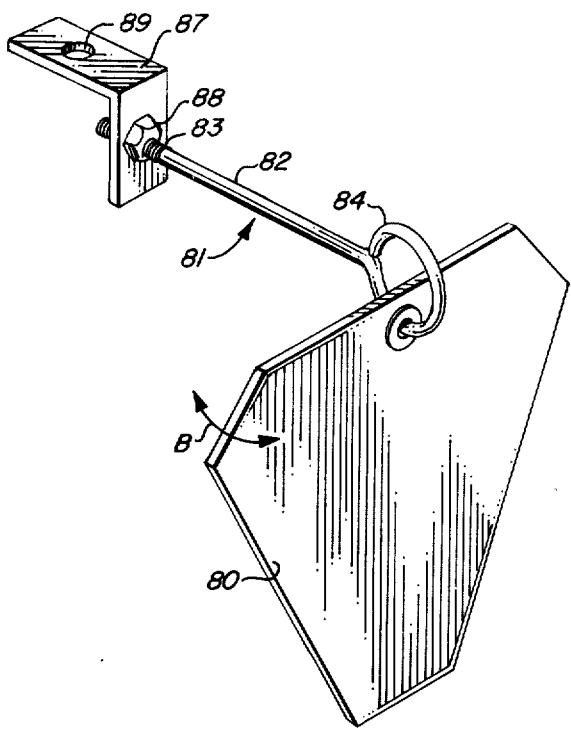
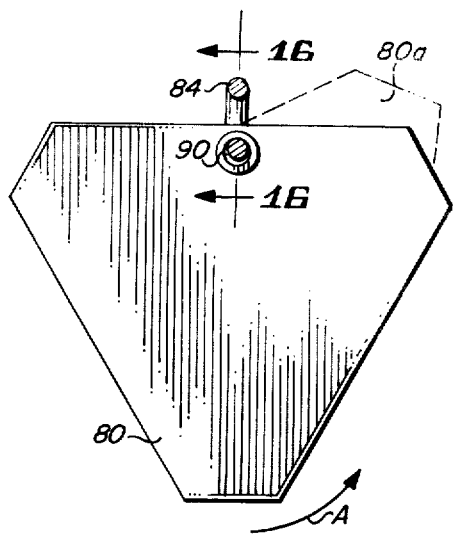
FIG-14
FIG-15
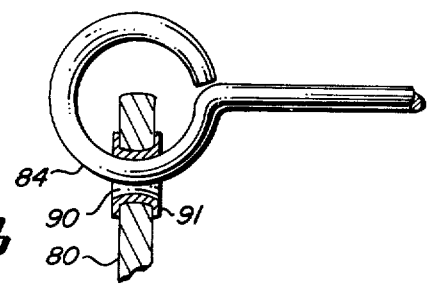
FIG-16
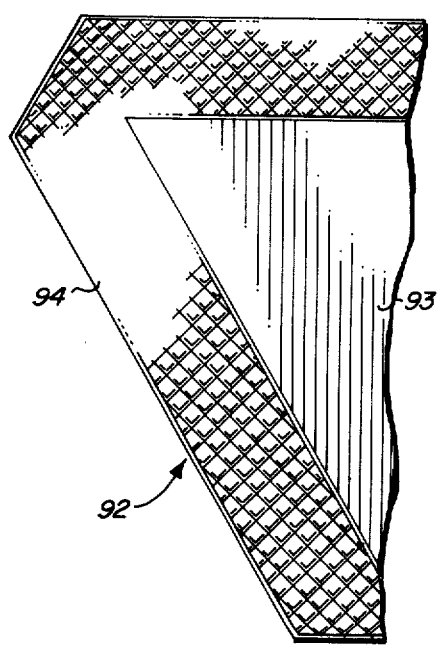
FIG-17
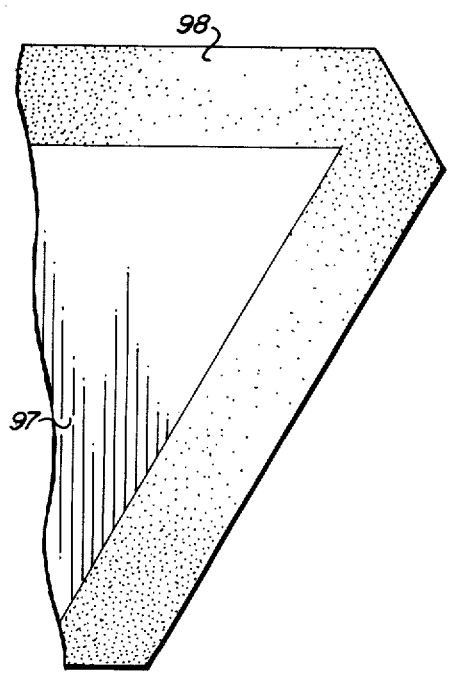
FIG-18

SAFETY REFLECTOR FOR BICYCLE

This application is a continuation-in-part application of applicant's co-pending U.S. Pat. application Ser. No. 349,441, filed Apr. 9, 1973, entitled "Safety Apparatus for Bicycle," which in turn is a continuation-in-part application of applicant's then co-pending U.S. Pat. application Ser. No. 247,739, filed Apr. 26, 1972, entitled "Safety Apparatus for Bicycle."

This invention relates to safety devices for bicycles. More particularly, the invention concerns a light emitting safety apparatus for improving the perceptibility of a bicycle.

Bicycle riding both as a means of transportation and as a sport has enjoyed an upturn in popularity in the last few years. This increase in popularity coupled with the ever increasing motor vehicle congestion results in hazardous conditions for both the motorist and the cyclist.

The cyclist oftentimes is a young person and, due to age, is usually unaware of the rules of the road and, in many instances, possesses an unthinking and irresponsible attitude. Thus, the motorist must assume the responsibility of watching out for the cyclist. This is a grave responsibility as even under the best of conditions, a bicycle is not always easy to see. This situation is compounded when less than ideal conditions exist such as congested roadways, inclement weather, or other causes of poor visibility such as exist during twilight or nighttime hours.

Bicycles are usually provided with relatively small circular reflectors of faceted glass or translucent plastic. However, these reflectors are visible from a completely inadequate distance and are virtually useless during daylight hours and are only slightly better during twilight hours. Neither do such reflectors attract particular attention to the bicycle. Since the relative movement of the bicycle is in alignment with an approaching vehicle, the driver perceives the reflector as a stationary light of constant intensity. If the bicycle is not perceptible, the reflector can be readily confused with similar reflectors on parked vehicles, sign posts and other stationary objects.

A particular prior art structure which improves the visibility of a bicycle is disclosed in U.S. Pat. No. 3,586,348, issued to Maurice E. Rich, Jr. on June 22, 1971. This prior art structure includes a tubular standard which mounts on the rear portion of the bicycle and extends upwardly from the vicinity of the rear wheel axle and attaches to the rear of an enlarged bicycle seat. The standard extends upwardly from the seat to approximately a height even with the shoulders of a rider. A reflective and/or sign-bearing surface is provided at the upper end of the standard.

While this particular prior art structure improves the visibility of a bicycle from the rear, it cannot be seen from the front of the bicycle as it is obstructed by the cyclist's body. Also, this structure provides no improvement in visibility of the bicycle from either side thereof. Also this prior art structure provides no means for reversibility, thus is may include either a reflective sign surface or a fluorescent sign surface, not both. The structure of the standard of this prior art device is complex and expensive and necessitates that it be employed only on a bicycle having an enlarged seat. To mount this standard on bicycles having standard size seats requires additional bracing.

Thus, it will be apparent that it would be highly desirable to provide a safety apparatus for a bicycle which improves the visibility thereof and overcomes some of the limitations of the prior art structures.

Accordingly, it is an object of the present invention to provide a new and useful safety apparatus for use on a bicycle.

Another object of the present invention is to provide a new and useful safety apparatus for a bicycle which improves the visibility thereof.

Still another object of the invention is the provision of a bicycle safety device having a light emitting signal shaped as the conventional and generally recognized symbol for a slow-moving vehicle.

Yet another object of the invention is the provision of a safety signalling device mounted so as to be in continuous motion for increased perceptibility.

Yet still another object of the present invention is to provide a new and useful bicycle safety apparatus which is reversibly affixable to various locations on a conventional bicycle to improve the visibility thereof from all directions.

A further object of the present invention is to provide a bicycle safety apparatus of the abovedescribed character which includes a rigid shield having a light emitting surface, either reflective or fluorescent, on one or both sides thereof and mounting means which reversibly attaches the apparatus to the bicycle.

Still a further object of the present invention is to provide a new and useful safety apparatus for bicyles which is sturdily constructed, yet inexpensively manufactured and readily attached to a bicycle.

Briefly, to achieve the desired objectives of the present invention, in accordance with a preferred embodiment thereof, provided is a safety apparatus for bicycles comprising a rigid substrate or shield preferably of triangular geometric configuration, having truncated corners. At least one surface of the shield is light emitting. As defined herein, a light emitting surface is one which has been especially constructed, treated, coated or otherwise prepared to exhibit characteristics which are commonly referred to as being reflective, fluorescent, luminescent, etc. The shield depends from mounting means by which the apparatus is affixed at any one of several locations upon a conventional bicycle.

The shield may be constructed to include various light emitting configurations on opposite sides thereof, or upon the same side. An alternate mounting means permits reversibility or removability of the shield. Mounting means are also provided whereby the shield depending therefrom maintains substantially constant motion as the bicycle moves along.

The foregoing and further and more specific objects and advantages of the present invention will become readily apparent to those skilled in the art from the following detailed description of the preferred embodiments thereof, taken in conjunction with the drawings, in which.

3

Figure 1:
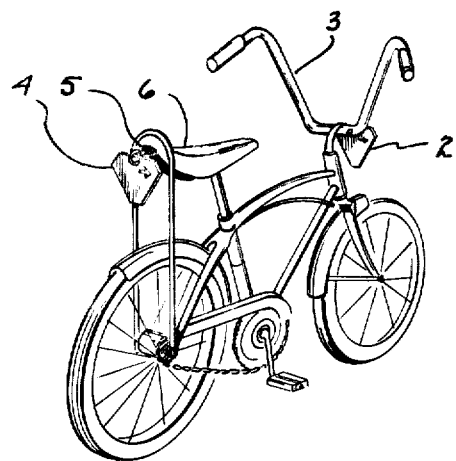
FIG. 1 is a perspective view of a bicycle having the apparatus of the present invention mounted thereon.
Figure 2:
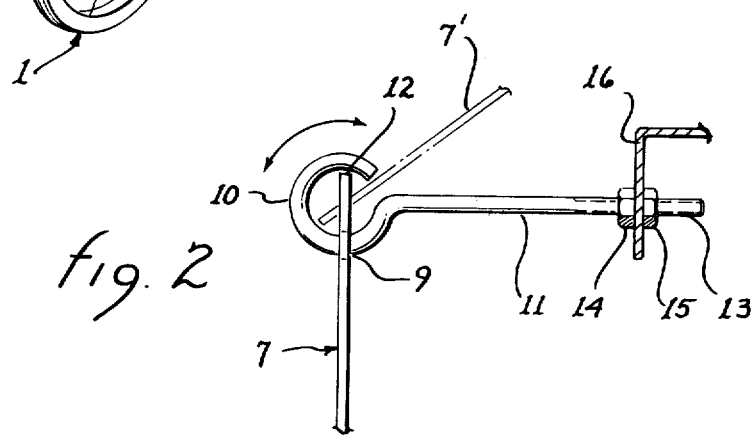
FIG. 2 is an enlarged fragmentary view illustrating a first mounting means for reversibly affixing the apparatus of the present invention to the bicycle.
Figure 3:
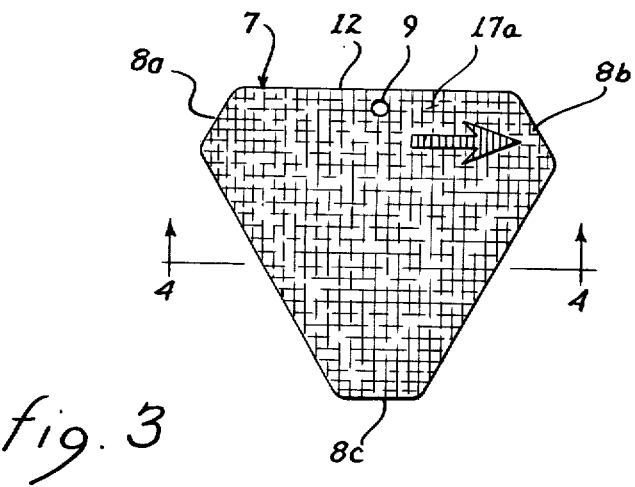
FIG. 3 is a view of the shield portion of the present invention illustrating the preferred geometric configuration thereof.

FIG. 4 is an enlarged fragmentary sectional view taken on the line 4—4 of FIG. 3;

FIG. 5 is a perspective view illustrating the apparatus of the present invention having an alternate mounting means for reversibly affixing the apparatus to the bicycle;

FIG. 6 is a fragmentary side view of the apparatus illustrated in FIG. 5 and showing the reversibility of that apparatus;

FIG. 7 is a gragmentary plan view of the apparatus of the present invention and illustrating another form of mounting means for reversibly affixing the apparatus to the bicycle;

FIG. 8 is a fragmentary side view of the apparatus illustrated in FIG. 7 and showing the reversibility of that apparatus;

FIG. 9 is a fragmentary plan view of the apparatus of the present invention and illustrating yet another form of mounting means for reversibly affixing the apparatus to the bicycle;

FIG. 10 is a fragmentary side view of the apparatus shown in FIG. 9 and illustrating the reversibility thereof;

FIG. 11 is a fragmentary plan view of the apparatus of the present invention and illustrating still another form of mounting means for reversibly attaching the apparatus to the bicycle;

FIG. 12 is a fragmentary side view of the apparatus shown in FIG. 11 and illustrating the reversibility thereof;

FIG. 13 is an enlarged fragmentary perspective view of the mounting means of FIGS. 11 and 12 and showing means for gripping a small structural member;

FIG. 14 is a perspective view of an alternately constructed bicycle safety apparatus similar to the device illustrated in connections with FIGS. 1-3;

FIG. 15 is a rear view of the device of FIG. 14;

FIG. 16 is a fragmentary vertical sectional view taken along the line 16—16 of FIG. 15;

FIG. 17 is a fragmentary view of the shield portion of the present invention illustrating an alternately preferred geometric configuration thereof; and FIG. 18 is a fragmentary view of the shield portion of the present invention illustrating yet another alternately preferred geometric configuration thereof.

Referring more particularly to the drawings, FIG. 1 illustrates a typical bicycle 1 as being fitted with a safety apparatus 2 of the present invention extending forwardly of the usual handle bars 3, and having a similar safety apparatus 4 extending rearwardly from the back 5 of the bicycle seat 6.

It should be understood that the particular mounting locations illustrated in FIG. 1 are exemplary only as the apparatus of the present invention may be mounted in several other locations, including those which would display the apparatus from the sides of the bicycle.

As seen best in FIG. 3, the safety apparatus 2 of the present invention includes a shield 7 preferably having a triangular geometric configuration with the corners 8a, 8b and 8c truncated to provide a distinctive shape somewhat similar to, but distinguishable from, the well-known "yield" sign. The preferred size of the shield may vary somewhat according to the size of the bicycle; however, it has been determined that a shield measuring approximately 7 inches per side with a 1 inch truncation provides an adequate surface for displaying reflective and fluorescent films, as will be described in detail.

4

Reference is now made to FIG. 4, wherein the specific structural details of the shield 7 may best be seen. One surface of the shield 7 consists of a layer 17a of highly reflective material such as that known as that known as high-intensity grade reflective sheeting or film manufactured under the trademark Scotchlite by Minnesota Mining and Manufacturing Co. This film 17a is normally provided in a yellow cast. The other or opposite surface consists of a layer 17b of fluorescent or luminous material such as that manufactured under the trademark Scotchcal by the same above-identified company. This film 17b is normally of orange or red-orange cast.

The reflective film 17a and the fluorescent film 17b are affixed such as with an adhesive or by other suitable bonding technique to a substrate 18. The substrate 18 may be fabricated of sheet metal or other appropriate material which results in a rigid structure.

The films 17a and 17b overlay the substrate 18 and the edges 19a and 19b (FIG. 4) are rounded off or beveled at the edge 20 of the substrate to minimize inadvertent peeling or delamination of the film from the substrate.

It may now be understood that the shield 7 fabricated as hereinbefore described to include a highly reflective surface and a highly luminescent surface is specifically designed in this manner to provide improved visibility of the bicycle under various situations such as daylight, nighttime and twilight. That is, the luminescent film 17b is ideally suited for improving visibility during daylight and early twilight hours or any other time when the headlights of a motor vehicle are not in use. On the other hand, the reflective film 17a is suitable for use when the headlights of the automotive vehicle would normally be in use.

To implement the desirable reversibility feature of the present invention, the apparatus 2 further includes means for reversibly mounting the shield 7 to the bicycle 1.

Several forms of the reversible mounting means are disclosed with the first of these forms being illustrated in FIG. 2. In this first form, a hole 9 is provided through the shield 7 intermediate the corners 8a and 8b near the edge 12 of the shield. The hole 9 is dimensioned and positioned so that the shield 7 may be removably slipped onto the eye portion 10 of an eye bolt 11, and is sufficiently displaced from the edge 12 of the shield to permit only limited lateral movement as the eye bolt 11 is tilted, as is common in bicycle movement. Thus, it will be seen that the shield 7 may readily be placed on, removed from or reversed upon the eye 10 of the bolt 11 by orienting it in the position indicated at 7'.

The eye bolt 11 terminates at its opposite end in a threaded portion 13 for receiving nuts 14 and 15 which serve to fix the eye bolt in place on the bicycle after a suitable hole has been drilled in a portion 16 of the bicycle which may, as previously indicated, be a bracket, handle bar, or other convenient section of the bicycle.

Reference is now made to FIGS. 5 and 6, which illustrate the apparatus 2 as including the shield 7 as previously described and having a second form of the reversible mounting means thereon. The mounting means of this embodiment obviates the necessity of drilling a hole in the bicycle as was required in the first embodiment.

This second form of the reversible mounting means includes a generally U-shaped clamp 21 of tempered steel having a central or bight portion 22 from the opposite ends of which a pair of flexible arms 23 extend that are biased toward each other. The outermost ends 24 of the arms 23 are flared outwardly to facilitate insertion of a tubular member 25, or other suitable portion of the bicycle, between the arms. An outwardly directed curvature 26 is formed in each of the arms 23 adjacent to the bight portion 22 for nestily receiving the member 25. Intermediate the curvature 26 and the flared end 24 of each of the arms 23 is formed a flat 27. The flats 27 face each other and each have an aperture 28 formed therein. The apertures 28 are in alignment so that after the apparatus 2 has been mounted on the member 25, it can be locked thereon such as by employing a conventional nut 29 which receives a special screw 30 of the well-known type which is easy to install but resists its removal in the absence of special tools.

As may be best seen in FIG. 6, the apparatus 2 is frictionally held in position by the clamp 21 and may be reversed from the solid line position shown in that figure to the dashed line position of the same figure. Reversal of the apparatus is accomplished by simply rotating the apparatus about the longitudinal axis of the member 25. Thus, it should be readily seen that the apparatus 2 is reversible for displaying either the reflective surface 17a or the fluorescent surface 17b, as visibility conditions dictate, and that this reversing can be accomplished without tools and without removing the apparatus from the bicycle.

Referring again to FIG. 6, it will be seen that the shield 7 is attached to the clamp 21 by a screw 31 which extends through the bight portion 22 of the clamp 21, through the shield 7 and into threaded engagement with a nut 32 formed of resilient material such as rubber or the like. With the shield and clamp mounted in this fashion, it will be seen that even though the shield and the clamp are held in close engagement, rotation of the shield about the longitudinal axis of the screw 31 is possible to permit adjustment of the shield 7 in accordance with the specific orientation of the clamp 21 on the bicycle. Thus, it will be understood that the resilient nut 32 will be pulled up tight enough to apply enough friction to prevent unwanted rotation of the shield, but not so tight that it can't be rotated to the desired position. It has been found that the use of the resilient nut 32 achieves this goal without working loose in ordinary usage.

Reference is now made to FIGS. 7 and 8, wherein a third form of reversible mounting means is illustrated as being fixedly attached to the shield 7. In this third species, a spring-loaded clamp 33 is attached such as by rivets 34 to the shield 7. The clamp 33 includes a fixed jaw 35 which is provided with mounting flanges 36 on its inner end and extends therefrom to form an outwardly directed curvature 37, a flat 38 and an outwardly flared end 39. A movable jaw 40 is mounted to the fixed jaw 35 by means of a pivot pin 41 and is biased toward the fixed jaw 35 by spring 42 in the well-known manner. The movable jaw 40 is also provided with an outwardly directed curvature 43, a flat 44 and a flared outer end 45 so as to receive and grip the member 25 as was previously described with reference to the U-shaped clamp 21. The spring-loaded clamp 33 may also be provided with a nut 46 and removal resistant screw 47 to lock the apparatus 2 to the bicycle, as was previously described.

As seen in FIG. 8, the spring-loaded clamp 33 allows rotation of the apparatus 2 about the member 25 from the solid line position to the dashed line position to accomplish the desired reversibility, as was hereinbefore described in detail.

Attention is now directed to FIGS. 9 and 10, wherein a fourth form of reversible mounting means is illustrated as attached to the shield 7. In this fourth form, the spring-loaded clamp 33, as was previously described in detail, is shown as being mounted such as by rivets 48 to the back surface of an upwardly extending plate 49 of a butt or piano hinge 50. The lower plate 51 of the hinge is attached, such as by rivets 52 to the shield 7 adjacent to the upper edge 12 thereof. An elongated strip of magnetic material 53, such as the well-known magnetic tape, is adhesively or otherwise affixed to the outwardly disposed surface of the upper hinge plate 49.

As seen in FIG. 10, reversibility of the apparatus 2 of this form is accomplished by allowing the shield 7 to hang downwardly, as shown in solid lines, which displays the fluorescent surface 17b, or by pivotably moving the shield 7 about the hinge pin 54 until it contacts and is magnetically held by the magnetic material 53, as shown in dashed lines. The dashed line position will display the highly reflective surface 17a of the shield 7. It should be noted that the spring-loaded clamp 33 employed in this fourth form of the apparatus 2 is merely exemplary as any type of clamp or other suitable means which affixes the upper hinge plate 49 to the member 25, would serve equally as well.

Reference is now made to FIGS. 11 and 12, wherein a fifth form of the reversible mounting means is illustrated as being attached to the shield 7. In this fifth form, a deformable loop member 55 is attached, such as by rivets 56, to the shield 7 adjacent to the upper edge 12 thereof. The loop 55 extends upwardly from the shield 7 for encircling engagement with the member 25 and is provided with a rearwardly disposed terminal end 57 having an elongated aperture 58 formed therein. The aperture 58 is positionable, by virtue of the deformability of the loop 55, so as to be alignable with an aperture 60 formed in the shield 7. A nut 61 and removable resistant screw 62 are employed to lockably reversibly secure the apparatus 2 in position. FIG. 12 illustrates the reversibility of this fifth form of the apparatus 2 of the present invention. The solid line position shows the fluorescent surface 17b as being displayed, and the dashed line position illustrates the apparatus as positioned to display the reflective surface 17a. As before, movement between the solid and dashed line positions may be accomplished by simply applying sufficient rotational force to overcome the friction existing between the member 25 and the holding means.

It should be noted that the loop member 55, although shown as a separate piece attached to the shield 7, may be formed fabrication therewith by forming the substrate 18 accordingly during initial fabriccation thereof.

Some structural members of bicyles are of substantially smaller diameter than are customarily employed in formation, for example, of the bicycle frame. So that the apparatus 2 of the present invention may be mounted to such smaller diameter members, an adjustable gripping means is provided as illustrated in FIG. 13. As seen in this figure, the deformable loop 55 is provided with a pair of spaced apart apertures 65 drilled therein at locations adjacent to the opposite side edges 66 of the upwardly extending portion of the loop. The loop 55 is also provided with extending tabs 67 punched or otherwise formed in spaced increments along the length of the loop 55. A spring 68 having a hook 69 on either end is formed with a pair of coiled segments 70 and an intermediate uncoiled segment 71. The hooks 69 are inserted into the apertures 65 and the uncoiled segment 71 is passed around the terminal end 57 of the loop 55 and moved upwardly until the coiled portions 70 of the spring 68 engage the small diameter member 73 with the proper amount of tension. The uncoiled segment 71 is then hooked over the specific tab 67 located nearest to the point where proper tension of the spring 68 is achieved.

It will be noted in FIGS. 1 and 3 that indicia such as the arrow shown in these figures may be provided on one or both of the surfaces of the shield. However, it is important that if any indicia is formed on these surfaces, it should be kept small so as not to detract from the reflective or fluorescent properties of that surface. Should the arrow be provided, it will serve as a reminder to the cyclist as to the proper side of the roadway upon which he should ride.

Attention is now directed to FIG. 14, which illustrates an alternate embodiment of a bicycle safety apparatus constructed in accordance with the teachings of the present invention and having a shield 80 generally similar to the shield 7, as hereinbefore described. Eye bolt 81 provides mounting means for supporting shield 80 and attaching the safety apparatus to the bicycle. Eye bolt 81 includes shank 82 having a threaded portion 83 at one end thereof and an integrally formed eye 84 at the other end thereof. Threaded portion 83 extends through an aperture in one leg of angular mounting bracket 87 and is secured thereto by nuts 88 on either side thereof. Aperture 89 within the other leg of mounting bracket 87 provides that the safety apparatus can be secured to the bicycle by any convenient screw or bolt found upon the bicycle. The angular displacement of the pre-existing bolt is unimportant since nuts 88 may be loosened and bracket 87 rotated about shank 82. It will also be readily apparent to those skilled in the art that bracket 87 may be removed and threaded portion 83 received within a suitably drilled hole within the bicycle, as previously described in connection with FIG. 2.

Eye 84, as specifically seen in FIG. 15, is disposed in a vertical plane and extends through aperture 90 in shield 80. Aperture 90 is of sufficient size that shield 80 is pivotally and movably suspended from the nethermost portion of the cylindrical member forming eye 84. The movement, however, has finite limits as a result of the placement of aperture 90, as hereinbefore described. As shield 80 moves in the direction of the arrow A and is displaced to the dotted line position indicated by the reference character 80a, the upper edge thereof abuts the upper portion of eye 84. It is preferable that movement in the direction of the arrow A be limited to approximately 30°. Shield 80 is also movable about an imaginary vertical axis, as indicated by the double-headed arrow B. Displacement in the direction of the arrow B is determined by the relative difference between aperture 90 and the diameter of the material from which eye 84 is formed. It is preferable that this movement not exceed 5° in either direction from normal.

The motion imparted to the bicycle from road vibration and the rider will maintain the shield 80 is constant movement, as described in connection with the arrow A and B above. Shield 80 also moves to and fro, particularly as a result of acceleration and deceleration of the bicycle. Here, the triangular shape of shield 80 is particularly advantageous. The shield decreases in size and, therefore, effective frontal area in proportion to the distance from aperture 90. That is, the lower portion of shield 80, the further removed from aperture 90, is less sensitive to wind pressure created by the forward velocity of the bicycle. The shield, therefore, will tend to hang in a substantially vertical plane instead of flaring out rearwardly as a result of the well-known kite or sail effect.

The continuous movement of shield 80 greatly contributes to the effectiveness of the safety apparatus of the present invention. The continuous movement directs particular attention to the safety apparatus and ultimately the bicycle, in contrast to stationary reflectors which are found along various roadways. The movement is limited, however, such that an approaching motorist generally is confronted with a full view of shield 80. The limited movement also prevents the shield from turning completely over and becoming entangled when the bicycle is laid over, as is conventional practice especially with youthful riders. Entanglement is a particular consideration when the safety device is affixed beneath a seat which includes various springs and bracings thereunder. It is also noted herein that shank 82 may be of any length to accommodate the particular needs of the user. For example, if the safety apparatus is attached underneath the seat, which is desirable in order to bring the shield up to eye height, shank 82 can have sufficient length to extend to the rear of a saddle bag or tool kit, as commonly carried at the rear of the seat.

To prevent aperture 90 from enlarging due to wear and, therefore, permitting movement of shield 80 beyond preferable limits, a slide bearing or bushing 91 is included therein. This modification is particularly preferred when shield 80 is fabricated from material substantially softer than eye 84.

For increased perceptibility, shield 80 may be variously fabricated. As hereinbefore described, the shield may include a rigid substrate to which is affixed a fluorescent or reflective film to one or both sides thereof. In an alternate embodiment, shield 80 is formed from a single piece of luminescent acrylic, especially the type commonly referred to as "dayglow."

FIG. 17 illustrates another alternate shield 92 having a heterogenous surface treatment. Provided is a smooth, luminescent inner portion 93 having a prismatic reflective border 94. In accordance with modern plastic manufacuring techniques, shield 92 is integrally molded or cast as a single unit. For increased perceptibility, the central arcs 93 and the border 94 are of contrasting colors, such as dayglow yellow and red, respectively.

Yet another embodiment of the invention is shown in FIG. 18, in which the luminescent acrylic shield 97 is bounded by reflective tape 98 such as that produced by Canrad Precision Industries, Inc., and sold under the trademark "Spot-Lite." Spot-Lite film and Scotchlite film are available in various colors, as are the dayglow acrylics. Numerous highly attention-attracting combinations are therefore available and suitable for use on either the front or the rear of the bicycle. A white border is particularly recommended for the front. It is also within the scope of the invention that a bicycle be provided with two safety devices, each having a shield with an appropriately colored front and rear surface. Shields 92 and 97 further direct the attention of an approaching motorist to the bicycle since each shield is in the general configuration of the well-known symbol for a slow-moving vehicle.

While the principles of the invention have now been made clear in illustrative embodiments, there will be immediately obvious to those skilled in the art many modifications of structure, arrangement, proportions elements, materials and components, used in the practice of the invention which are particularly adapted for specific environments and operating requirements without departing from those principles. The appended claims are, therefore, intended to cover any such modification within the limits only of the true scope of the invention.

Having fully described and disclosed the present invention and the preferred embodiments thereof in such clear and concise terms as to enable those skilled in the art to understand and practice the same, the invention claimed is:

1. In combination with a bicycle, a safety signal which moves automatically in response to normal vertical and lateral movements of said bicycle during operation thereof, said signal comprising:
 a. elongate eye-bolt means including a shank portion fixedly attached to said bicycle and an eye portion generally disposed in a vertical plane and extending outwardly from said bicycle; and
 b. a generally triangular shield member, having at least one light-emitting surface, pivotally suspended from said eye portion of said bolt, said eye portion passing through an aperture formed approximately midway along one edge of said shield member and spaced inwardly therefrom a distance to define limits on the displacement of said shield member with respect to said eye-bolt in response to normal operation of said bicycle, said limits being approximately ± 5° from the vertical in a forward and rearward direction and approximately ± 30° laterally.

* * * * *